April 7, 1942.   P. B. MURPHY   2,278,940
PICTURE REPRODUCTION
Filed Jan. 3, 1938   7 Sheets-Sheet 1

INVENTOR
P. B. MURPHY
BY
C. A. Sprague
ATTORNEY

April 7, 1942.                    P. B. MURPHY                    2,278,940
                              PICTURE REPRODUCTION
                              Filed Jan. 3, 1938                 7 Sheets-Sheet 2

INVENTOR
P. B. MURPHY
BY
*C. A. Sprague*
ATTORNEY

April 7, 1942. P. B. MURPHY 2,278,940
PICTURE REPRODUCTION
Filed Jan. 3, 1938 7 Sheets-Sheet 3

INVENTOR
P. B. MURPHY
BY
C. A. Sprague
ATTORNEY

FIG. 8

April 7, 1942.   P. B. MURPHY   2,278,940
PICTURE REPRODUCTION
Filed Jan. 3, 1938   7 Sheets-Sheet 5

Patented Apr. 7, 1942

2,278,940

UNITED STATES PATENT OFFICE 2,278,940

PICTURE REPRODUCTION

Paul B. Murphy, South Nyack, N. Y., assignor to Western Electric Company, Incorporated, a corporation of New York Application January 3, 1938, Serial No. 183,059

8 Claims. (Cl. 178—5.2)

This invention relates to picture reproduction and particularly to apparatus for and methods of producing enlarged paintings of an original picture or design, for example, mural paintings.

An object of the invention is to produce directly upon a desired surface, a wall, for example, a reproduction of an original picture or design which is pleasing and artistic in appearance.

Another object is to produce enlarged paintings of a picture or design upon a plane or somewhat irregular surface in a single color or in a variety of colors upon a desired background color.

In accordance with an embodiment of the invention herein shown and described for the purpose of illustration, there is provided a projector for projecting an enlarged optical image of a picture upon a plane parallel to a substantially plane surface, a wall, for example, upon which the enlarged picture is to be produced. The projecting light beam is preferably interrupted periodically. Adjacent to the wall surface is positioned apparatus for scanning the projected periodically interrupted image to produce an alternating (or pulsating) current modulated with respect to amplitude in accordance with the tone values of the image and for spraying paint or other suitable marking fluid upon the wall, under control of the modulated alternating current. This apparatus includes a movable carriage upon which is mounted a photoelectric cell for receiving, through a light aperture, light from the elemental areas in succession of the image and also an air brush of special design for controlling the spraying of paint or other suitable marking fluid upon the wall under control of the image modulated alternating current, the valve for admitting marking fluid to the nozzle of the air brush being alternately opened and closed at a frequency equal to that of the alternating current and by an amount corresponding to the amplitude of the alternating current. If desired, instead of interrupting the light beam which projects the image, there may be provided a circuit including a source of alternating current which is modulated in accordance with the light activation of the light sensitive scanning element.

In a modified arrangement for producing pictures in colors there is employed a dispersion prism for directing light of different colors projected from the picture to be reproduced to different light sensitive electric elements, respectively. Alternating currents of different frequencies are modulated under control of different light sensitive elements, respectively, thus producing a plurality of modulated alternating currents, one for each of a plurality of color components. In this arrangement there is provided an air brush of special construction in which a plurality of fluids of different color, respectively, for example one for each primary color, are mixed prior to being ejected from the nozzle of the air brush, a plurality of valves, one for each coloring fluid under control of different modulated currents, respectively, being utilized for controlling the amount of each fluid going into the mixture.

In another modified arrangement for reproducing enlarged pictures in a single color or in a plurality of colors, the original picture is projected upon a ground glass screen to produce an image larger than the original but smaller than the enlarged picture to be produced. A movable carriage supports a photoelectric cell mounted in proximity to a scanning aperture for scanning an image formed on the ground glass screen along successive parallel lines, the ground glass screen also being supported by the carriage. For reproducing pictures in natural colors, three separate transparencies made from color separation negatives and each corresponding to a different color are projected upon different ground glass screens, respectively, and the images are separately simultaneously scanned to produce three image currents, one for each of the three color components of the picture to be produced. The carriage carrying the scanning apparatus is driven through flexible shafts and through a variable speed transmission gearing by means of the mechanism for driving the carriage carrying the air brush for reproducing the picture. By varying the speed of the scanning carriage in steps and by varying the size of the images projected upon the ground glass screens, the ratio of the size of the reproduced picture to that of the original can be accurately controlled.

Referring to the drawings.

In accordance with the embodiment of the invention shown in Figs. 1 to 6, inclusive, there is provided a picture projector 20 mounted upon rods 21, which form part of a pedestal 22, the height of which is adjustable. The projector is movable along the rods 21 but it may be locked in position by the locking clamp 23. The projector comprises a suitable light source 24, condenser lenses 25, aperture screen 26 and objective lenses 27, for projecting an image of the picture 28. The light interrupting disc 29 having a plurality of light transmitting openings 30 therein is driven by a motor 31 to interrupt the light beam repeatedly at a rate higher than the rate of scanning the elemental areas in succession of the projected image to introduce a carrier component into the image current.

Figure 1:
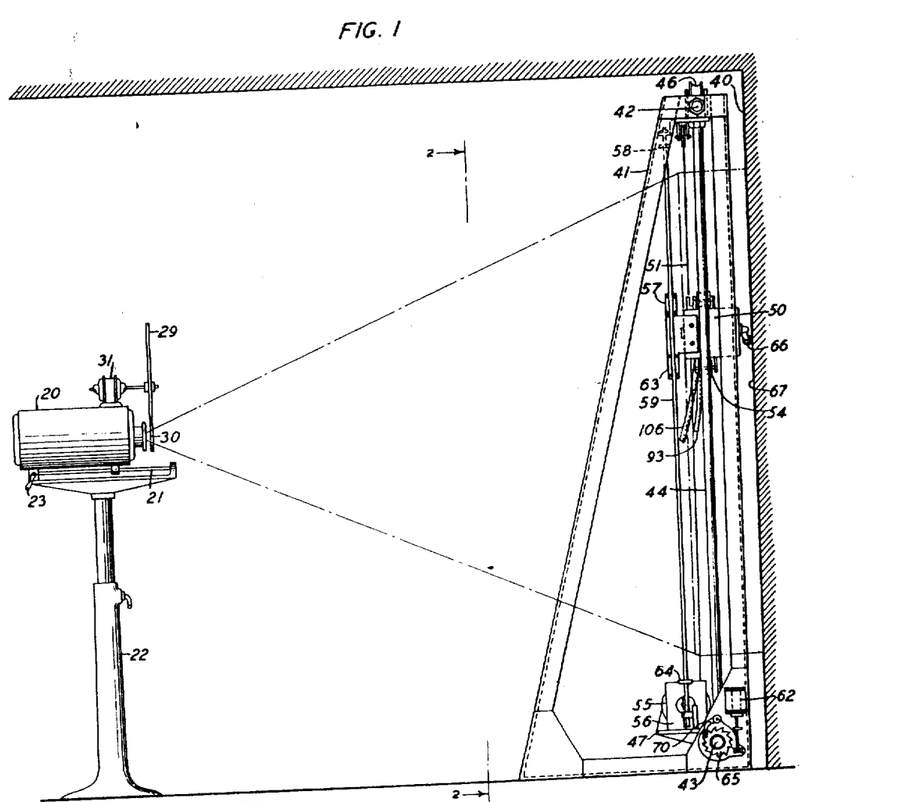
Fig. 1 is a side elevation of a picture reproducing apparatus in accordance with the present invention.
Figure 2:
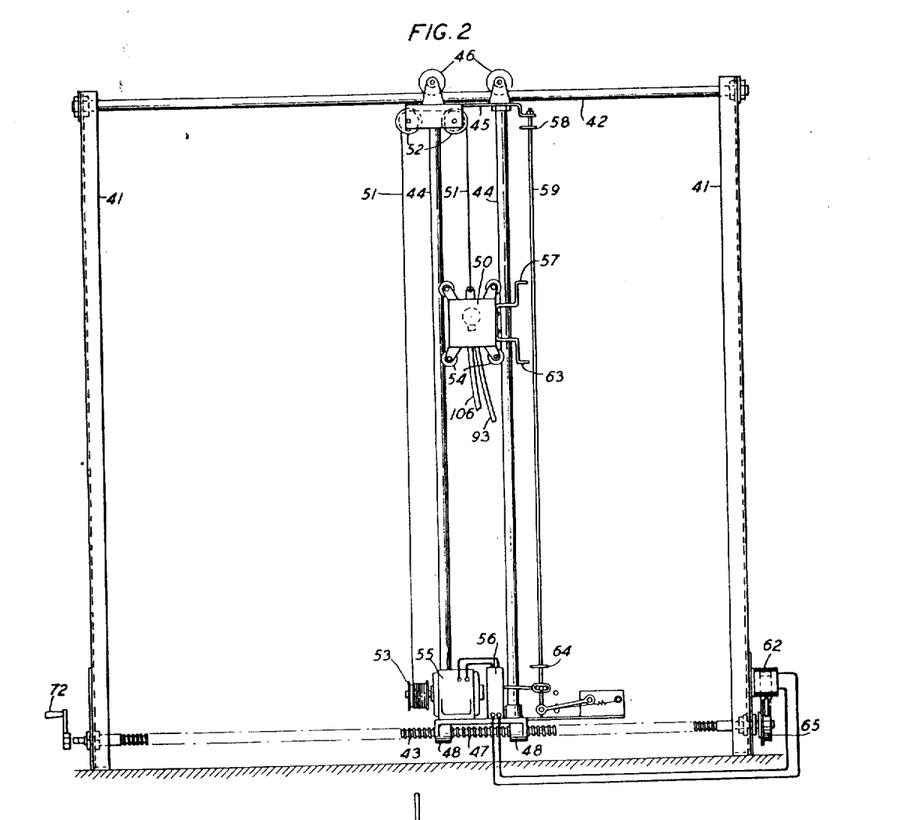
Fig. 2 is a rear elevation of a portion of said apparatus.
Figure 3:
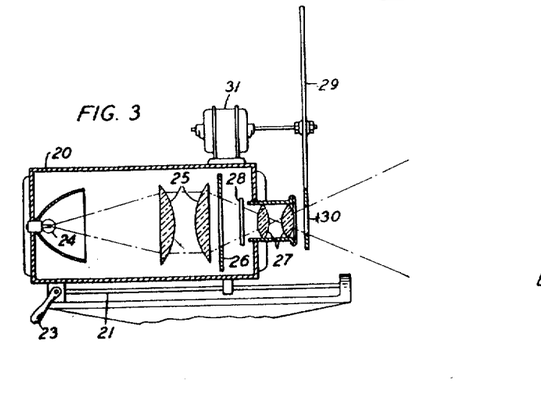
Fig. 3 is a plan view of the image projecting apparatus shown in Fig. 1.
Figures 4, 14:
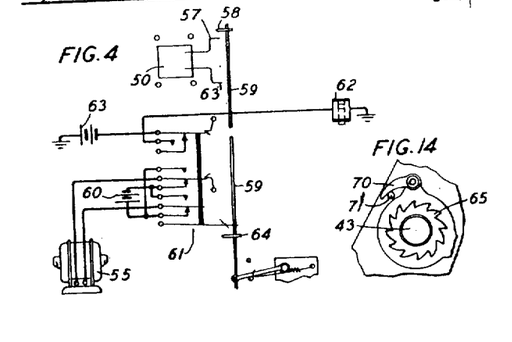
Fig. 4 is a diagrammatic showing of the motor reversing mechanism used in the apparatus shown in Figs. 1 and 2.
Fig. 14 is an enlarged view showing a detail of the apparatus shown in Fig. 1.

Adjacent to a surface, such as the wall 40, is positioned an apparatus for producing an enlarged painting of the original picture 28. This apparatus includes a supporting frame 41 to which are secured a horizontal track 42 at its upper portion and a lead screw 43 at its lower portion. The vertical tracks 44 each are secured at their upper end to a member 45 on which are mounted wheels 46, the latter being adapted to ride along the horizontal track 42. The lower end of each vertical track is secured to a member 47 which is adapted to be driven horizontally through the nuts 48 in engagement with the lead screw 43. The carriage 50 is supported by a cable 51 which passes over guide pulleys 52 attached to member 45 and which is wound up upon a drum 53. The carriage 50 is guided between vertical tracks 44 by the wheels 54 secured to the carriage. The drum 53 is driven by a motor 55 first in one direction and then in the other to alternately raise and lower the carriage 50, under control of switch 56, shown in detail in Fig. 4. When the carriage 50 approaches the upper limit of its travel, the arm 57 attached to carriage 50 engages the arm 58 secured to vertical rod 59 to raise the rod 59 and thus operate a switch 61 to reverse the connection from battery 60 to motor 55. The motor is thus caused to run in the reverse direction to lower the carriage 50. At this time the switch 61 also closes for a short interval a circuit for energizing the winding of stepping magnet 62 by current from battery 63, thus causing the ratchet gear 65 to advance a step and causing the rotation of lead screw 43 to which ratchet gear 65 is attached, to move the vertical tracks 44, member 45 and carriage 50 to a new position.

When the carriage 50 approaches the lower limit of its travel, the arm 63 attached to carriage 50 engages arm 64 to lower the rod 59 to the position shown in the drawing. The switch 61 thus reverses the motor 55 and the stepping magnet 63 is thus energized momentarily to cause the tracks 44 to be moved farther along the lead screw 43. When the picture production is completed, the pawl 70 (Fig. 14) may be manually pulled out of engagement with the ratchet 65 and a pin 71 placed in an opening for holding the pawl out of engagement. The lead screw may then be turned manually by means of the crank 72 to return the assembly including the vertical rods 44 to its original position. The carriage 50 is provided with a guide wheel 66 for running against the wall surface 67 upon which a painting is to be produced, thus maintaining the nozzle of the air gun properly spaced from the wall.

Figures 5, 6, 9:
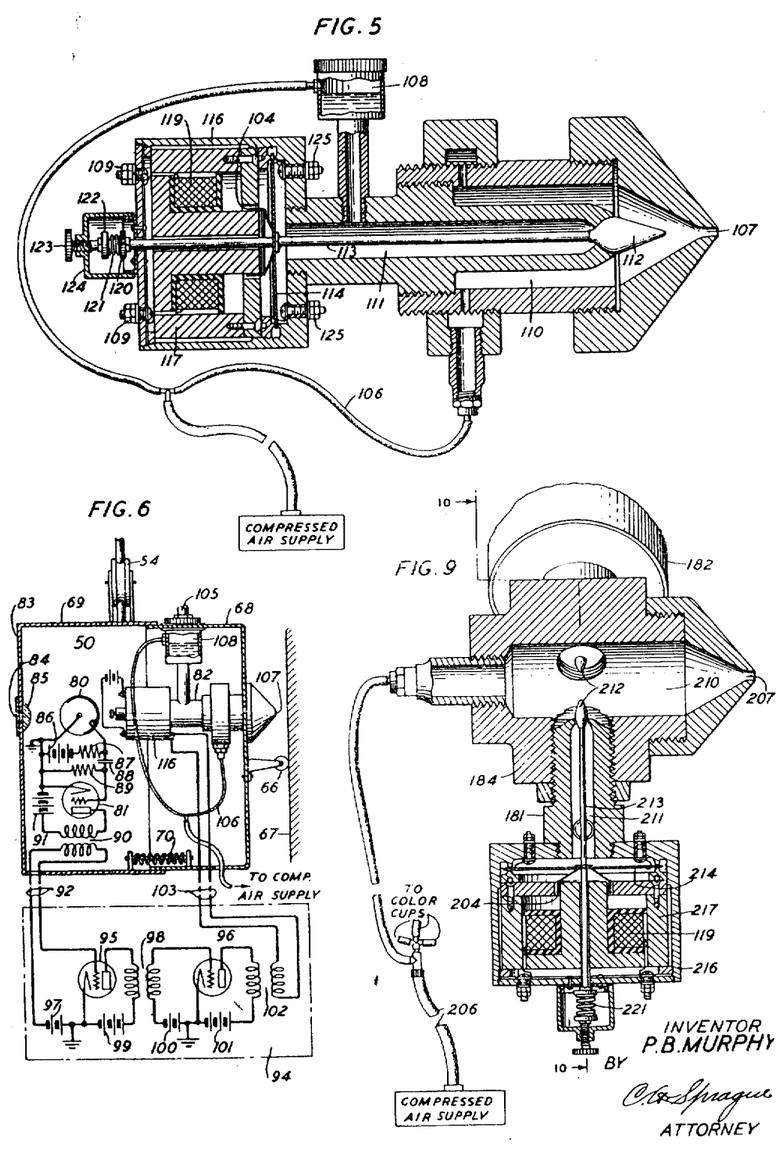
Fig. 5 is a detailed sectional view of the air brush shown in Fig. 1.
Fig. 6 is a diagrammatic showing of the movable carriage of Figs. 1 and 2 and the associated electrical circuits.
Fig. 9 is a side elevation partly in section of an air brush employed in the arrangement shown in Fig. 8.

As shown in Fig. 6, one portion 68 of carriage 50 telescopes within the other portion 69 and the springs 70 produce a force between the two portions to maintain the guide wheel 66, attached to portion 68, in contact with the wall 67. The casing 68, 69 forms a light-tight enclosure in which are mounted a light sensitive cell 80, an amplifier stage comprising vacuum tube 81 and air brush 82.

Figure 7:
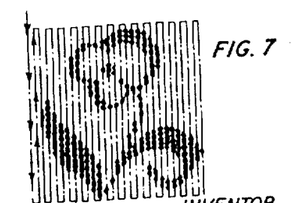
Fig. 7 is a diagram showing the path traced by the image scanning and picture producing apparatus.

In setting up the equipment for operation, the pedestal 22 is moved into position to project upon the wall 67 an image of the size which it is desired to produce thereon, the projector 20 being at the forward position. The projector is then moved along the track 21 away from the wall a certain distance to project an image of the same size in a plane parallel to the wall in which lies the rear portion 83 of the carriage 50. Due to the movement of the carriage 50, an aperture 84 therein traces adjacent parallel paths in succession as indicated diagrammatically by the broken line in Fig. 7. This light from the elemental areas in succession of the projected image is transmitted through the aperture 84 and is thus directed by a lens 85 upon the light sensitive surface of the photoelectric cell 80. The polarizing battery 86 and resistive element 87 are connected in series in the anode-cathode circuit of the photoelectric cell 80. The light sensitive cathode is also connected through a condenser 88 to the control grid of vacuum tube 81 and the anode of light sensitive cell 80 is connected to the cathode of vacuum tube 81. Across the anode-cathode circuit of tube 81 is connected an input resistor 89. The output circuit of the amplifying vacuum tube 81 comprises the primary winding of transformer 90 and the anode battery 91. The pair of conductors 92 in the cable 93 connect the secondary winding of transformer 90 to the input circuit of an amplifier 94 comprising vacuum tubes 95 and 96. A grid biasing battery 97 is connected in the grid-cathode circuit of vacuum tube 95 and the anode circuit of this tube comprises the primary winding of transformer 98 and anode battery 99. The secondary winding of transformer 98 is connected in series with the biasing battery 100 to the grid-cathode circuit of vacuum tube 96, the anode circuit of which comprises battery 101 and primary winding of transformer 102. The secondary winding of transformer 102 is connected by the pair of conductors 103 of cable 93 to the movable coil 104 of the electrodynamic driving element of the air brush 82. Paint or other marking fluid is supplied to the air brush from a reservoir 108 and air under pressure is supplied to the air brush through flexible tubing 106. Air under pressure is also supplied to the reservoir 108 through tube 105 to maintain the marking fluid under pressure. The cable 93 may have additional conductors for supplying heating current for the cathode of tube 81, for example. The purpose of the guide roller 66 in conjunction with the springs 70 is to maintain the orifice 107 of the air brush a fixed distance from the wall 67.

As shown in Fig. 5, air under pressure flows from tube 106 through the passage 110 and through the orifice 107, the air flowing continuously during operation. The liquid coloring fluid under pressure flows from reservoir 108 into channel 111. The opening at one end of channel 111 is normally closed by tip 112, which is secured to a rod 113. The channel 111 is closed at the other end by a flexible diaphragm 114, the central portion of which is secured to rod 113. The moving coil 104 is secured to the central portion of diaphragm 114 and is positioned between the pole pieces of the electromagnet 117 having a winding 119. The peripheral portions of diaphragm 114 and the electromagnet 117 are suitably supported by the outer barrel 116, as shown in the drawings. Suitable leads connect the moving coil to the terminals 125 to which the source of picture modulated current is connected and the winding 114 is connected to terminals 109 to which is connected a source of direct current. The pressure of the coloring liquid against the one side of diaphragm 114 produces a force in a direction to maintain the channel 111 normally closed by the tip 112, this force being relatively large because of the relatively large area of diaphragm 114 in contact with the coloring fluid. This force may be so large that the nozzle would not be opened in response to picture current impulses of small amplitude impressed upon the movable coil 104. Means are therefore provided for setting up a variable force acting in opposition to the force produced by the liquid pressure so that the nozzle will be opened in response to small amplitude picture impulses of one polarity and so that the nozzle will be closed in response to the impulses of opposite polarity. For this purpose there is secured to the end of rod 113, opposite the tip 112, a metal disc 120 to which is secured a helical spring 121, a second disc 122 being secured to the opposite end of the spring. The thumb screw 123 threaded into a tapped portion of the housing 124 engages the disc 122 for compressing the spring 121 by a desired amount.

The current impressed upon the winding 104 is an alternating current, the frequency of which is equal to the frequency of interruption of the light beam by the light interrupting disc 29, this alternating current being modulated with respect to amplitude in accordance with the tone value of successively scanned elemental areas of the projected image. Each half cycle of one polarity of the current flowing through the winding 104 causes the diaphragm 114 and rod 113 to move in a direction to cause the tip 112 to move away from the end of the passage 111, thus permitting marking fluid to flow from the passage 111. The passage 111 is closed in response to the current impulses of opposite polarity. The streamline shape of tip 112 permits the current of air which is flowing continually under pressure to carry off and atomize all of the marking fluid liberated by each movement of the tip. Thus the accumulation of drops of marking fluid which would result in undesirable splotches or irregularities in the reproduced picture or pattern is avoided. The atomized marking fluid is ejected from the nozzle 107 upon the wall surface 67 and since the nozzle 107 is moved along a path like that traced by the image scanning aperture 84, an enlargement of the picture 28 is painted upon the wall 67.

Figure 8:
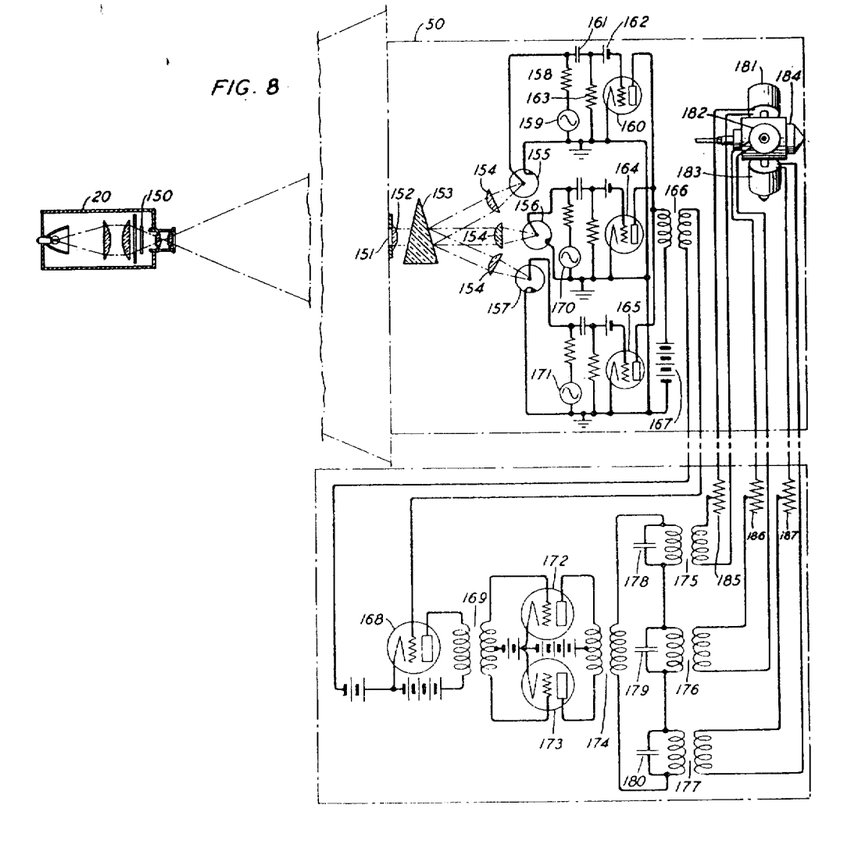
Fig. 8 is a schematic showing of a modification of the arrangement according to the preceding figures adapted for reproducing multicolor pictures.
Figure 10:
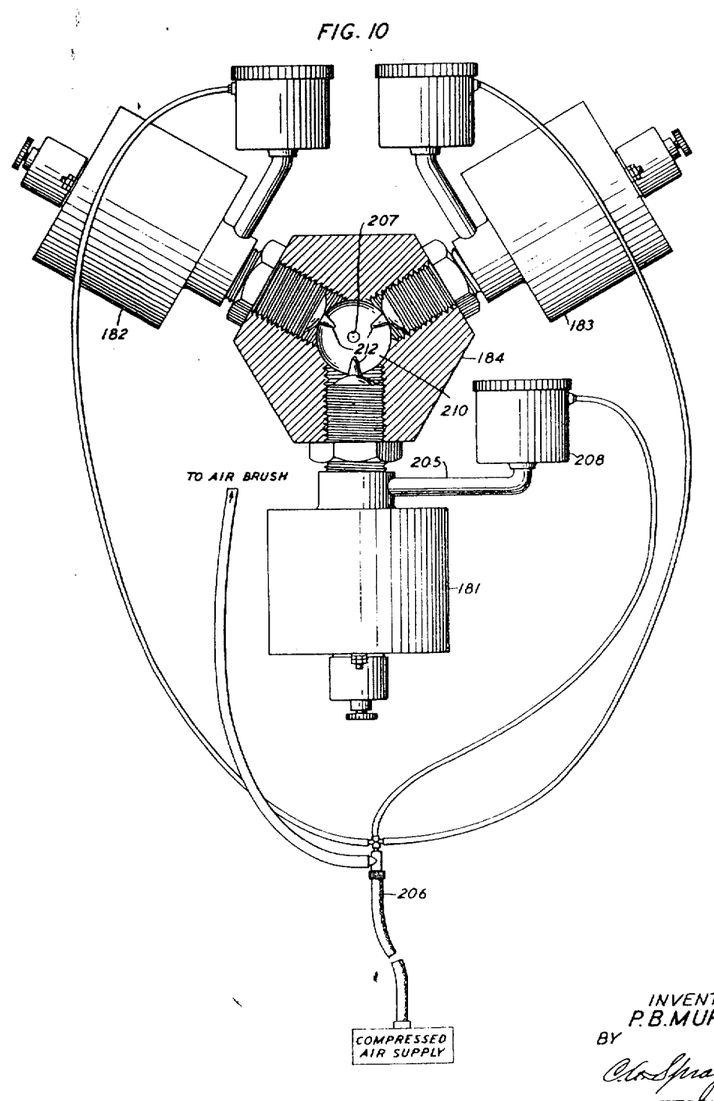
Fig. 10 is a view partly in section of the air brush as viewed along the line 10—10 of Fig. 9.

With a modified arrangement shown in Figs. 8, 9 and 10 pictures or patterns can be produced in a plurality of colors, natural colors, for example. As in the arrangement described above, the projector 20 projects an enlarged image of the picture 150 and this projected image is scanned by the moving aperture 151 in the carriage 50. The light beam entering the aperture 151 is directed in substantially parallel rays by the lens 152 upon the dispersion prism 153. The resulting light beams of different colors, respectively, which may be the primary color components, are directed by means of the lenses 154 upon the photoelectric cells 155, 156 and 157, respectively. If desired, instead of employing a prism to separate the light into its color components, a light filter may be used with each photoelectric cell for selecting a desired component of the light beam having all of the color components, this light beam being directed upon the cells through different color filters, respectively. In series with the photoelectric cell 155 there are connected a resistive element 158 and a source of alternating current 159, preferably of a frequency within the audible range. The resistive element 158 and alternating current source 159 in series are connected across the input circuit of the amplifier vacuum tube 160 through a condenser 161, the usual grid biasing battery 162 and grid leak resistor 163 being provided. Circuits similar to that connected to the photoelectric cell 155 are connected to the photoelectric cells 156 and 157, these circuits including alternating current sources 170 and 171, respectively, and vacuum tube amplifiers 164 and 165, respectively. The sources of alternating current 159, 170 and 171 are of different frequencies, respectively, such that they may be separated by tuned circuits or filters after being modulated in accordance with the picture tone values. The anode-cathode circuits of vacuum tubes 160, 164 and 165 are each connected in series with the primary winding of transformer 166 and the anode battery 167. The secondary winding of transformer 166 is connected across the input circuit of amplifier vacuum tube 168 and the output of this amplifier is connected through transformer 169 to the input circuit of a push-pull amplifier comprising vacuum tubes 172 and 173 and output transformer 174. The secondary winding of transformer 174 is connected to the primary windings of transformers 115, 116 and 177 in series, the primary circuits being tuned by means of condensers 178, 179 and 180 to select, respectively, the currents from sources 159, 170 and 171 which are modulated, respectively, in accordance with the tone values of the different color components of the picture. If desired, of course, band-pass filters may be employed instead of the tuned transformer circuits for selecting the image currents corresponding to the different color components of the picture. The secondary windings of transformers 115, 116 and 117 are connected, respectively, to the windings of the color nozzles 181, 182 and 183 of the air gun 184 through the variable resistor elements 185, 186 and 187, respectively.

The air gun 184 is shown in Figs. 9 and 10. During operation air under pressure is supplied to the air gun and the air flows continuously from tube 206 through the mixing chamber 210 and through the orifice 207. The three color nozzles 181, 182 and 183 are provided, each for supplying color of one of the three color components of the picture under control of the corresponding image current from transformers 115, 176 and 177 to the mixing chamber 210. The longitudinal axes of the three color nozzles lie in a plane perpendicular to the axis of the mixing chamber and the axis of each color nozzle forms an angle of about 120 degrees with the axis of each of the other color nozzles. The three color nozzles are alike in construction. Considering the nozzle 181, the liquid coloring matter is introduced under pressure, due to the supply of compressed air from tube 206 to the color reservoir 208, into channel 211 through the tube 205. The opening at one end of channel 211 is normally closed by tip 212 which is secured to a rod 213. The channel 211 is closed at the other end by a flexible diaphragm 214, the central portion of which is secured to rod 213. The moving coil 204 is secured to the central portion of diaphragm 213 and is positioned between the pole pieces of the electromagnet 217 having a winding 219. The peripheral portion of diaphragm 214 and the electromagnet 217 are suitably supported by the outer barrel 216 as shown in the drawing. The pressure of the coloring fluid against one side of the diaphragm 214 produces a force in a direction to maintain the channel 211 normally closed by the tip 212, this force being relatively large because of the relatively large area of diaphragm 214 in contact with the coloring fluid. The means including the spring 221 is provided for opposing the force due to the fluid pressure so that the resultant force tending to maintain the tip 212 in closed position when no picture current is impressed upon the coil 204 may be adjusted to a desired value as explained in connection with the above description of Fig. 5.

Each half cycle of one polarity of the current flowing through the winding 219 causes the armature 218 to be attracted and the tip 212 to move away from the end of passage 211 by an amount dependent upon the amplitude of the current flowing through winding 219, thus permitting coloring fluid to flow into the mixing chamber 210. The three fluids of different color, respectively supplied in varying portions by the color nozzles 181, 182 and 183, are mixed and atomized in the chamber 210 and ejected from the nozzle 207 upon a wall or other surface to reproduce the picture 150 in colors.

Figure 11:
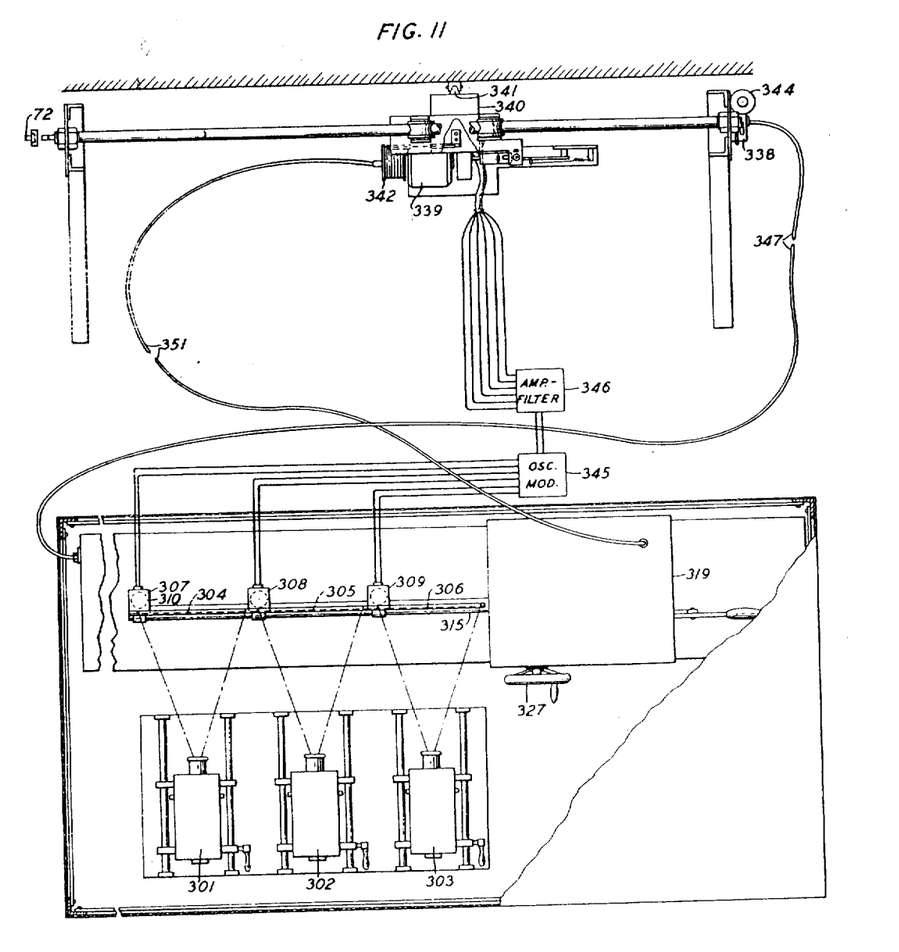
Fig. 11 is a plan view of a modified picture reproducing apparatus in which the image scanning device and the picture reproducing device are mounted upon different movable carriages, respectively.
Figures 12, 13:
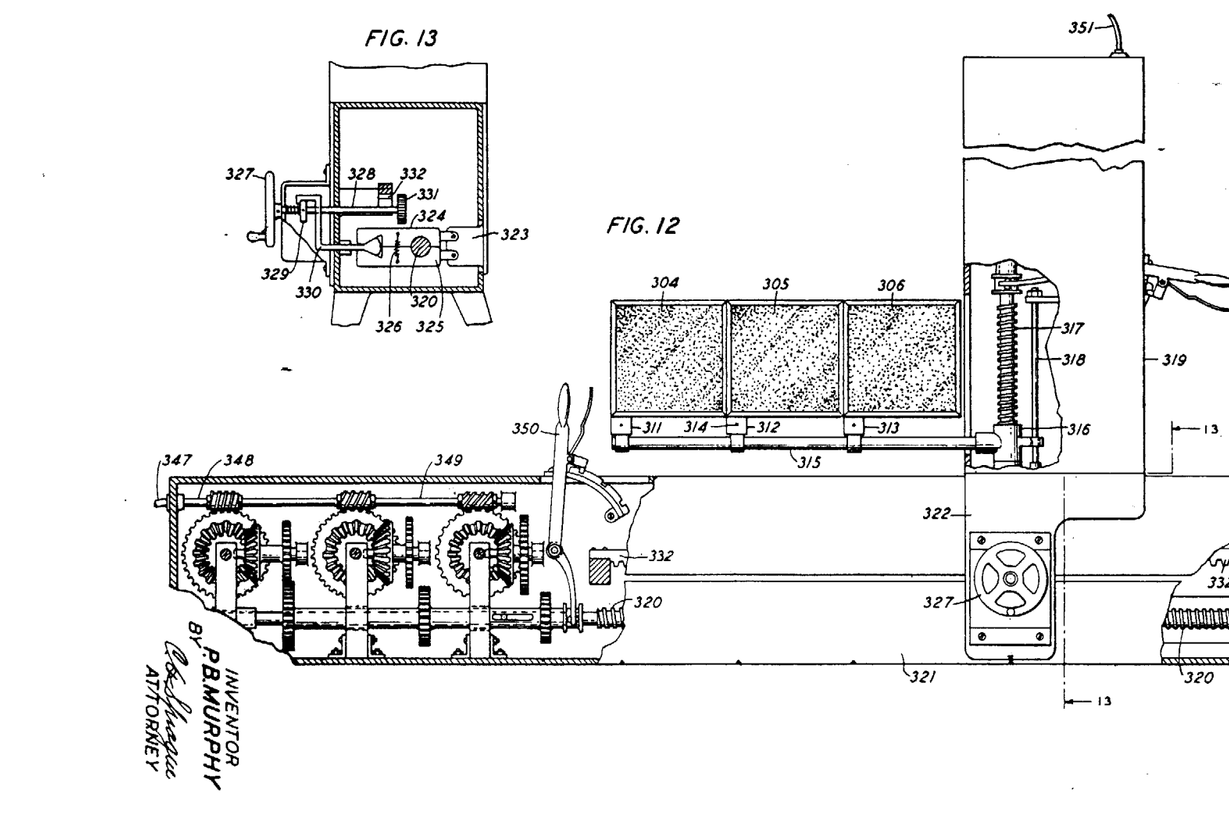
Fig. 12 is a rear elevation of a portion of the apparatus shown in Fig. 11, parts being broken away to show details of construction.
Fig. 13 is a side view partly in section taken along the line 13—13 of Fig. 12.

In Figs. 11, 12 and 13 is shown a modification of the apparatus shown in the preceding figures for producing mono-color or multi-color paintings. This apparatus is particularly adapted for use in locations where there is insufficient space to permit the projection of an image of the size of the picture to be produced. Also, the apparatus is of such size that a suitable enclosure may be provided for the picture projector and picture scanning apparatus so as to prevent extraneous light from reaching the photoelectric cells when reproducing multi-color images.

Three picture projectors 301, 302 and 303, like the projector 20 of Fig. 1, are provided each for projecting from a transparency made from color separation picture negative. When it is desired to reproduce a picture in a single color, of course, it is necessary to use only one of the projectors. The projectors project images of a size larger than the original but smaller than the picture to be produced, upon the ground glass screens 304, 305 and 306, respectively. Photoelectric cells 307, 308 and 309 are provided for scanning the three projected images, the cells being positioned within enclosures 311, 312 and 313, respectively, each enclosure having a scanning aperture 314 therein for admitting light to the enclosed photoelectric cell from the elemental areas in succession of the projected image. The screens and photoelectric cell enclosures are mounted on a suitable traveller which is a modification of a conventional lathe bed and lead screw arrangement. As shown in the drawing the screens 304, 305 and 306 and the photoelectric cell enclosures 311, 312 and 313 are rigidly supported by a rod 315, one end of which terminates in a nut 316 which engages a lead screw 317 supported by the housing 319. The rod 318 which is rigidly supported by the housing 319 passes through an opening in a projecting portion of the nut 316 for maintaining the nut 316 in proper alignment with the lead screw 317.

The screens 304, 305 and 306 and the photoelectric cell housings 311, 312 and 313 are moved vertically due to the rotation screw 317. Horizontal motion is imparted to these elements due to the rotation of the lead screw 320 which is supported by the housing 321. For this purpose there is secured to the apron portion 322 of the housing 319 a member 323, the jaws 324 and 325 of which when closed by the action of spring 326 form a nut which engages the lead screw 320. The nut may be moved out of engagement with the screw 320 by pulling the wheel 327 forwardly, as viewed in Fig. 12. This pull causes the shaft 328 to which the wheel 327 is secured to be moved toward the left as viewed in Fig. 13 and due to this movement of shaft 328, the collar 329 attached to shaft 328 engages one end of the bent rod 330 to cause the jaws 324, 325 to open. The movement of shaft 328 also brings the pinion 331 which is mounted upon the shaft into engagement with the rack 332, thus permitting the housing 319 together with the screens 304, 305 and 306 and the photoelectric cell housings 311, 312 and 313 to be moved manually in a horizontal direction by turning the wheel 327.

The apparatus for reproducing a picture under control of photoelectric cells 307, 308 and 309, shown in the upper portion of Fig. 11, is similar to the apparatus disclosed in Figs. 1, 2, 4, 9 and 10. The carriage 340 carries an air brush similar to the air brush 184 shown in Figs. 9 and 10 and having a nozzle 341. The carriage is moved vertically by means comprising a motor 339 and a cable drum 342, like the motor 55 and the cable drum 53, respectively, of Fig. 2. The carriage is moved horizontally by means comprising a lead screw 343, not shown, like the lead screw 43 of Fig. 2, and a stepping magnet 344 like the stepping magnet 62 of Figs. 1, 2 and 4. The ratchet wheel 338 is secured to one end of lead screw 343. The photoelectric cells 307, 308 and 309 are connected to the input of an oscillator-modulator circuit 345, the output of which is connected through an amplifier-filter circuit 346 to the windings of the air brush having nozzle 341. The circuit arrangement connecting the photoelectric cells with the air brush may be substantially as shown in Fig. 8.

The lead screw 320 is driven by the stepping magnet 344 through a flexible shaft 347 connected to the shaft 343 at one end and to the shaft 348 and the variable speed transmission gearing 349 at the other end. The transmission gearing may be of any well-known construction and includes a gear shift lever 350 for effecting a change in gear ratio so that the rate of movement of and, therefore, the distance of travel of, the screens 304, 305 and 306 and their associated photoelectric cells in a horizontal direction may be varied with respect to the horizontal motion of the carriage 340. The lead screw 317 is driven through a variable speed transmission gearing similar to the gear 349 and through flexible shaft 351 by the motor 341.

In operating the apparatus of Figs. 11, 12 and 13, the three transparencies made from color separation negatives corresponding to different primary color components, for example, are positioned in different projectors 301, 302 and 303, respectively. The projectors are adjusted so as to focus the images of the transparencies upon the ground glass screens 304, 305 and 306, respectively. The use of ground glass permits the images to be viewed from the side opposite the side upon which the images are projected and provides a surface on which pencil marks can be made and later erased. By operating the wheel 324 the arrow on the lower edge of the apron 322 can be brought into alignment with any of the three marks upon the housing 321. The distances between these markings are made equal to the distances between the centers of the scanning apertures 314 of the photoelectric cell housing 311, 312 and 313. By means of these markings and a sharp pencil outline of some part of the image which shows on all three transparencies, exact positioning of the projectors so as to secure registration of the images can be obtained. In operation the entire framework carrying the screens 304, 305 and 306 and the photoelectric cells and housings moves up and down and advances horizontally at the end of each vertical movement. In this manner the scanning apertures 314 will simultaneously scan images projected from the color transparencies by the projectors 301, 302 and 303, respectively. The movement of the air brush carriage 340 will be at all times in the same direction relatively as that of any of the photoelectric cell housings 311 but the carriage 340 will be moved through a relatively greater distance. Thus the reproduced image will be larger than the projected image which is scanned, the latter in turn being an enlargement of the original picture transparency from which the image is projected. For producing images in a single color obviously only one of the projectors need be used for projecting the image.

It may be desired to provide for a larger number of enlargement ratios than can be obtained with a practical number of fixed gear ratios. With the apparatus shown in Figs. 11, 12 and 13 enlargement ratios between the variable fixed steps can be provided by moving the three projectors so as to project a scanning image of an exact size which when enlarged by one of the variable fixed gear ratios will provide a reproduced image of exactly the size desired. Because of the distance between the projectors and the scanning areas it will be possible to set up any desired masking or vignetting scheme in order to provide for double printing of parts of more than one transparency on a given area of reproduction. Also the entire scanning equipment described can be made small enough in size so that the entire unit can be covered by a collapsible shield which is substantially light-proof. The flexible shafts 347 and 351 may be replaced, if desired, by suitable interlocking motor systems.

The system shown in Fig. 6 is adapted for transmitting from a negative transparency, that is, when large amounts of light intermittently reach the photoelectric cell 80, an alternating current of large amplitude is produced for energizing the winding of the electrically controlled valve of the air brush 104 and a large amount of marking fluid is ejected from the air brush. The arrangement shown in Fig. 8, on the other hand, is adapted for transmitting from a positive transparency since, when a large amount of light reaches the photoelectric cell 155, the amplitude of the alternating current produced for energizing the air brush 181 is small and a small amount of pigment is ejected from the air brush. This arrangement obviously can readily be modified for transmitting from a negative, for example, by connecting only the resistive element 158 across the input circuit of vacuum tube 160 instead of the resistive element 158 and the alternating current source 159 in series.

In addition to producing mural paintings upon walls, the apparatus may be used, for example, for producing special patterns upon dress goods, draperies, upholstery materials, leather for fancy shoes, purses, etc., fabric for wall decoration, wall paper, background scenes for motion picture sets, stage scenery and special advertising posters.

What is claimed is:

1. Picture producing apparatus comprising an air brush having an electrically operated valve for regulating the flow of marking fluid thereto, and means for impressing upon said valve a periodically varying current modulated with respect to amplitude in accordance with tone values of successive elemental areas of a picture.

2. Picture producing apparatus comprising an air brush having an electrically operated valve for regulating the flow of marking fluid thereto, said valve being opened by varying amounts in accordance with the amplitude of the energizing current supplied thereto over a range of current amplitudes, and means for supplying to said valve, for operating it, periodically recurring current impulses of amplitudes within said range separated by intervals during which the current has an amplitude outside of said range.

3. Picture producing means comprising a source of alternating current modulated in accordance with the tone values of successively scanned elemental areas of a picture, an air brush having an electric valve for controlling the amount of marking fluid supplied thereto, and means for supplying modulated alternating current from said source to said valve for operating it.

4. Picture producing apparatus of the type employing an air brush supplied with a plurality of marking fluids of different characteristics, respectively, comprising a support, a plurality of semi-transparent screens and a plurality of light sensitive scanning means, one for each screen, fixedly mounted upon said support, means comprising a lead screw for causing the movement of said support in response to the rotation of the screw about its axis, means comprising a second lead screw for causing a movement of the first lead screw in a direction substantially perpendicular to its axis, means for projecting images to be scanned upon said screens respectively, means comprising said light sensitive means for controlling the supply of said marking fluids to said air brush, and means for causing said air brush to be moved along a path corresponding to the path over which any one of said scanning means is moved but at a relatively higher rate so that the air brush traverses a larger area than that traversed by one of said light sensitive means.

5. Image producing means comprising a source of current having variations representative of tone value of successive elemental areas of a picture to be produced and also periodic changes in amplitude not representative of picture tone value, an air brush having an electrically controlled valve for controlling the ejection of marking fluid therefrom, and means for impressing current from said source upon said valve to cause it to respond to all of said variations.

6. Apparatus for producing a picture record of an image projected thereon comprising a carriage having an aperture therein for receiving light from a portion of the projected image, a light sensitive device for receiving the light transmitted through said aperture mounted upon said carriage, an air brush mounted upon said carriage having an electrically operable valve for controlling the amount of marking fluid ejected from the nozzle of said air brush upon said record surface, a transmission circuit at least a portion of which is mounted upon said carriage for electrically connecting said light sensitive device with the valve of said air brush, a track for guiding the movement of said carriage, means for causing the carriage to move along said track alternately in opposite directions, a second track for guiding the movement of said first track in a direction transverse to the direction of movement of said carriage along said first track, and means for causing a movement of said first track for each reversal in the direction of movement of said carriage.

7. Apparatus for producing pictures in a plurality of colors comprising a substantially light-tight carriage having a scanning aperture therein, a plurality of light sensitive means mounted within said carriage for receiving light of different color components respectively of the light transmitted through said aperture and for setting up picture currents corresponding to the different color components respectively, means for producing a visual indication in response to said picture currents and varying in accordance with the variations of said currents, said means being mounted on said carriage, and means for transmitting said picture currents to said indication producing means, at least a portion of said transmission means being mounted upon said carriage.

8. Picture scanning apparatus comprising a support, a semi-transparent screen mounted upon said support, means for projecting an image upon said screen, a light sensitive means mounted upon said support in fixed relation to said screen, means for moving said support alternately in opposite directions, and means for intermittently moving said support in a direction substantially perpendicular to said first-mentioned directions.

PAUL B. MURPHY.